Patented Mar. 10, 1942

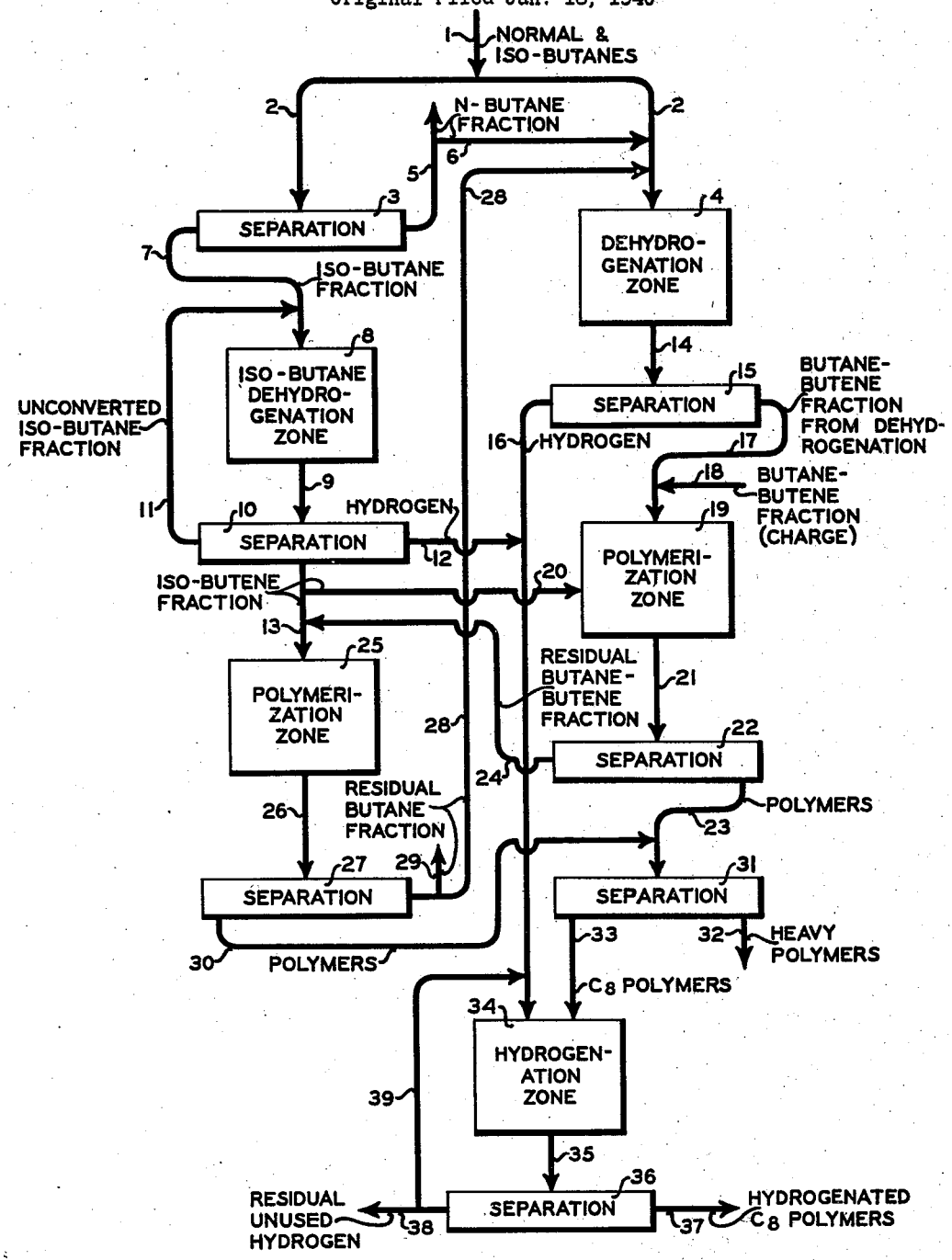

2,276,199

UNITED STATES PATENT OFFICE 2,276,199

PRODUCTION OF ISO-OCTANE

Louis S. Kassel, Chicago, Ill., assignor to Universal Oil Products Company, Chicago, Ill., a corporation of Delaware Continuation of application Serial No. 314,484, January 18, 1940. This application November 22, 1940, Serial No. 366,734

11 Claims. (Cl. 196—10)

This invention relates to a process for the manufacture of iso-octane from butanes and more specifically it is concerned with a process involving a series of individual steps combined in a novel and advantageous manner so that they cooperate to produce optimum results in the conversion of butanes to iso-octane. This application is a continuation of my earlier application Serial No. 314,484, filed January 18, 1940.

The process of dehydrogenation which involves scission of carbon to hydrogen bonds to produce olefins from paraffinic hydrocarbons is beginning to find wide application for production of charging materials for catalytic polymerization whereby the outlook for the production of high grade aviation gasoline has materially improved. Dehydrogenation, however, is an expensive operation and can only be justified when substantially all of the olefins formed are utilized but more particularly when they are polymerized to normally liquid polymers which upon hydrogenation yield a product having a relatively high octane rating making it valuable as an aviation gasoline.

In the polymerization of butenes wherein the proportion of normal butenes to iso-butene in the fraction is ordinarily high, the ratio sometimes exceeding 3:1, it is possible under selected conditions to substantially completely polymerize the isobutene and obtain a very satisfactory amount of cross-polymerization between the iso and normal butenes. However, since in the ordinary charging material formed as a product in a cracking operation or in the dehydrogenation of a butane fraction, the normal butenes exceed or are produced considerably in excess of iso-butene, a substantial proportion of the normal butenes even under optimum conditions remain unconverted. Substantially complete removal of normal butenes may be obtained in a subsequent polymerization step under more drastic conditions, however, the polymers obtained in this latter step have a relatively poor octane rating upon hydrogenation as compared to iso-octane produced by the cross-polymerization of normal and iso-butenes or by the polymerization of iso-butene only followed in each case by hydrogenation. Since the normal butene polymer has a relatively low octane rating after hydrogenation and since its value is small as compared to the standard iso-octane, the expense at which normal butene is produced in dehydrogenation cannot be justified in a process which provides for the straight polymerization of normal butene in a secondary polymerization treatment.

In addition to those reasons stated above for the desirability of substantially completely removing the normal butenes from the residual gases after polymerization, others also suggest themselves, the most obvious of which is that it is undesirable to return butenes in any form to the dehydrogenation zone because the amount of conversion to olefins which may be effected is materially decreased as equilibrium between the butenes and butanes is partially reached before any dehydrogenation is effected. In addition, when butenes are recycled to the dehydrogenation treatment, it is also possible that the production of di-olefins may be increased, and since they break down more readily the carbon deposition may also increase.

One obvious method of avoiding the production of excess quantities of normal butenes by dehydrogenation of butanes would involve separation of iso-butane from the normal butane and dehydrogenation of the former to iso-butene. This method, however, would restrict the production of iso-octane substantially to the available iso-butane with only a small proportion of normal butane being used. This process, therefore, would not be particularly valuable, since relatively large amounts of normal butane exist and a relatively large proportion thereof would remain unused.

My invention obviates the necessity of a separate normal butene polymerization step and provides for polymerizing a substantial portion of the normal butenes available under conditions which give a high ratio of normal butenes removed to iso-butene and in addition provides for substantially complete removal of normal butenes by polymerizing them in the presence of an excess of iso-butene, thereby converting substantially all of the butenes formed in the process and introduced thereto to iso-octenes which are converted to iso-octane upon hydrogenation.

To accomplish the object of my invention, I propose to separate the charging stock containing the normal and iso-butanes into two portions, one portion of which is subjected to fractionation to separate the normal butane from the iso-butane whereupon the iso-butane is subjected to dehydrogenation treatment and the normal butane recovered for blending in gasolines to raise its vapor pressure or for any other desired purpose, and the second portion of which is subjected to separate dehydrogenation treatment. Preferably also the separation into the two portions is controlled so that the portion subjected to fractionation contains a quantity of normal butane which is in excess of the amount which eventually will be dehydrogenated and polymerized to normally liquid polymers. In addition, this fraction also contains iso-butane in an amount equivalent to the molal ratio of normal and isobutanes in the charging stock and this is the iso-butane which is subjected to separate dehydrogenation treatment. For example, if the charging stock contains iso and normal butane in the mol ratio of 3:7 before dehydrogenation, on the basis of 100% conversion of butanes to butenes in dehydrogenation and on the basis that 1 mol of n-butene may be polymerized per mol of iso-butene, the object would be to fractionate that portion of the charge containing the excess of n-butane or 40 mol % with the corresponding amount of iso-butane. Therefore, in the case of the example stated above on a 100 mol basis, the portion subjected to fractionation treatment would contain 40 mols of normal butane and approximately 17 mols of iso-butane or, in other words, the charging stock is separated into a fraction containing approximately 57 mols of the charging stock and one containing approximately 43 mols.

In one specific embodiment the invention comprises separating the charging stock consisting essentially of normal and iso-butanes into two portions, subjecting one portion to fractionation to separate the normal from the iso-butanes and recovering the normal butane fraction, subjecting the iso-butane fraction to dehydrogenation treatment, substantially separating the products, recycling the unconverted iso-butane and recovering therefrom substantially only iso-butene and hydrogen, simultaneously therewith subjecting the other portion of said charging stock to a separate dehydrogenation treatment, together with the unconverted butanes separated as hereinafter set forth, separating hydrogen from the butene fraction formed in the last mentioned dehydrogenation treatment and commingling the former with the hydrogen from the first mentioned dehydrogenation treatment for use as hereinafter set forth, subjecting said butane-butene fraction to polymerization treatment and introducing at least a portion of the iso-butene formed in the first mentioned dehydrogenation treatment at intermediate points in said polymerization treatment whereby to effect the desired cross-polymerization between the normal and iso-butenes, separating the residual butane-butene fraction from the polymers formed in said polymerization treatment, commingling the former with the residual portion of the iso-butene and subjecting the mixture to a separate polymerization treatment under conditions selected to effect substantially complete removal of the olefins contained in the mixture, separating the residual butane fraction from the polymers formed in said separate polymerization treatment and supplying the former as said unconverted butanes to the second mentioned dehydrogenation treatment, commingling the normally liquid polymers formed in both polymerization treatments, fractionating the mixture to separate heavy polymers therefrom and subjecting the lighter polymers to hydrogenation treatment to form iso-octane using hydrogen formed and separated as hereinbefore set forth.

The accompanying diagrammatic drawing illustrates the principal steps of the process, the drawing being in the form of a flow diagram in order to avoid complicating it with unnecessary details.

Reference is now made to the flow diagram. Charging stock comprising normal and iso-butanes is introduced through line 1 and is passed into line 2 where the charge is separated into two portions, one portion being introduced to separation zone 3 and the other portion to dehydrogenation zone 4. Preferably, also, the portion introduced to separation zone 3 corresponds to that portion of the charging stock which contains an amount of normal butane in excess of the quantity which, if converted to normal butenes, could advantageously be utilized in the system; i. e., it corresponds to the amount of normal butane which, if all the butanes introduced to the system were converted to butenes, would remain unpolymerized after the subsequent polymerization treatments. In separation zone 3 the iso and normal butanes are separated from each other and the normal butane fraction removed by way of line 5 and recovered as a product of the process for use in blending with distillates to meet vapor pressure requirements or for any other desired purpose. It is also within the scope of the invention, however, to commingle all or a portion of the normal butane fraction in line 5 with the other portion of the charging stock subjected to dehydrogenation treatment in zone 4 by directing it through line 6 into line 2, in which case unconverted butanes separated after the polymerization treatments would be withdrawn from the process in order to avoid a buildup of normal butanes in the system. The first procedure, however, is preferred over the latter, in view of the fact that the unconverted butane separated as hereinafter described after the polymerization treatment contains also iso-butane which is the more desirable component.

The iso-butane fraction separated in zone 3 is directed through line 7 and commingled with the unconverted iso-butane fraction separated as hereinafter described, and the mixture subjected to dehydrogenation treatment in zone 8. Dehydrogenation in zone 8 may be accomplished in any of the well known forms of apparatus in the presence of catalysts having a selective action in promoting the dehydrogenation reaction. Products of the dehydrogenation treatment in zone 8 consisting essentially of unconverted iso-butane, iso-butene, and hydrogen are directed through line 9 to separation zone 10 where the unconverted iso-butane is separated from the iso-butene and hydrogen and the former returned as recycle to the dehydrogenation treatment by way of line 11. Hydrogen separated in zone 10 from the iso-butane and iso-butene is removed by way of line 12 and commingled in line 16 with hydrogen formed as hereinafter described, the mixture being used in a subsequent hydrogenation treatment. The iso-butene fraction separated in zone 10 is removed by way of line 13 and is utilized in the manner to be described later.

The residual portion of the charging stock not introduced to separation zone 3 is commingled, when desired, with the residual unconverted butane fraction separated as hereinafter described, and the mixture subjected to dehydrogenation treatment in zone 4. Here again dehydrogenation may be accomplished in any of the well known forms of apparatus and in the presence of catalytic materials capable of promoting the desired reaction. The products of the dehydrogenation treatment in zone 4 consisting essentially of butanes, butenes, and hydrogen are directed through line 14 to separation zone 15 wherein the hydrogen is separated from the butane-butene fraction and the former removed by way of line 16 and commingled with the hydrogen formed in the dehydrogenation treatment in zone 8 as previously described.

The butane-butene fraction separated in zone 15 is removed therefrom by way of line 17 and, when desired, commingled with the butane-butene fraction introduced from an outside source by way of line 18 and the mixture subjected to polymerization treatment in zone 19. When a butane-butene fraction is introduced to zone 19 from an outside source, it is also within the scope of the invention to provide for the removal of normal butane in separation zone 3 equivalent to the amount of normal butane present in the butane-butene fraction in order to avoid an increase in concentration of normal butane in the residual unconverted butane which is returned to dehydrogenation zone 4 in the manner to be described later.

Polymerization treatment in zone 19 is preferably carried out in at least two stages and preferably also in the presence of a suitable polymerizing catalyst such as, for example, sulfuric acid or the solid phosphoric acid-containing catalyst. The multiple stage polymerization treatment in zone 19 is advantageous from the standpoint of flexibility, for with this procedure it is possible to provide for the introduction of iso-butene between the various stages whereby the optimum ratio of iso-butene to normal butene may be maintained in each stage. Iso-butene for this purpose may be supplied from separation zone 10 by way of line 13 and line 20 and introduced in such quantities so as to maintain the desired ratio of iso to normal butene.

The polymerization products from zone 19 are directed through line 21 into separation zone 22 wherein the residual butane-butene fraction is separated from the normally liquid polymers and the latter removed by way of line 23 for treatment as hereinafter described. The residual butane-butene fraction separated in zone 22 is removed by way of line 24, commingled with the residual portion of the iso-butene fraction in line 13, and the mixture subjected to polymerization treatment in zone 25 under conditions selected to effect substantially complete removal of the iso and normal butenes. Polymerization treatment in zone 25 may be accomplished using a sulfuric acid catalyst or other catalysts such as the phosphoric acid-containing catalyst, and since the iso-butene is the predominating olefin in the mixture, conditions may very readily be selected to effect the desired cross-polymerization.

The products of the polymerization treatment in zone 25 are directed through line 26 to separation zone 27 wherein the residual butane fraction is separated from the normally liquid polymers and the former removed by way of line 28 and recycled to the dehydrogenation treatment in zone 4 for treatment as previously described, or, when desired, recovered as a product of the process by way of line 29. The normally liquid polymers separated in zone 27 are removed therefrom by way of line 30 and commingled with the normally liquid polymers in line 23 and the mixture introduced to separation zone 31 wherein by means of fractionation the heavy liquid polymers, preferably comprising those containing more than 8 carbon atoms to the molecule, are separated from the lighter normally liquid polymers. The heavy polymers separated in zone 31 are recovered as a product of the process by way of line 32. The lighter polymers comprising essentially iso-octenes are directed through line 33 to hydrogenation treatment in zone 34 which is preferably accomplished in the presence of a nickel-containing catalyst, while introducing hydrogen by way of line 16 separated from the dehydrogenated products as previously described.

The products of the hydrogenation treatment in zone 34 are directed through line 35 to separation zone 36 where the residual unused hydrogen is separated from the hydrogenated polymers and the latter recovered as a product of the process by way of line 37. Residual unused hydrogen is removed from separation zone 36 by way of line 38 and recovered or, when desired, returned to hydrogenation treatment in zone 34 by way of line 39.

The following are the results which may be obtained from a process conducted in accordance with the invention as above described. It is merely one specific example and it is not to be considered a limiting feature, for results may vary depending upon the catalyst and conditions employed and charging stock composition.

In this example the charging stock consists of a butane fraction containing approximately 700 mols of normal butane and 300 mols of iso-butane. This material is divided into two portions, one portion containing approximately 420 mols of normal butane and 180 mols of iso-butane, and the other portion containing 280 mols of normal butane and 120 mols of iso-butane. The first portion having the higher normal butane content is subjected to fractionation to separate an iso-butane fraction from the normal butane fraction, the former containing approximately 170 mols of iso-butane and 10 mols of normal butane being subjected to further treatment and the latter containing 410 mols of normal butane and 10 mols of iso-butane is recovered as a product of a process.

The iso-butane fraction totaling 180 mols of both normal and iso-butane is subjected to dehydrogenation treatment in the presence of an alumina-chromia catalyst at a temperature of 1000° F. and at a pressure of approximately 20 pounds per square inch. The catalyst may be prepared by the precipitation of alumina as a hydrogel, the hydrogel dried and pelleted and the pellets impregnated with chromic acid, after which they are dried and calcined to form a catalytic material containing aluminum oxide and chromic oxide. The ultimate recycle products from the isobutane dehydrogenation treatment containing approximately 144 mols of iso-butene and 8½ mols of normal butene, unconverted butanes and hydrogen are subjected to cooling and condensation and the hydrogen separated and recovered.

The residual portion of the charging material containing approximately 280 mols of normal butane and 120 mols of iso-butane is subjected to a separate dehydrogenation treatment in the presence of a catalytic material of substantially the same composition as that previously described under substantially the same conditions of temperature and pressure. Neglecting the unconverted butanes leaving the last mentioned dehydrogenation treatment for recycle operation is employed, the material leaving the last mentioned dehydrogenation zone contains approximately 238 mols of normal butene, 10 mols of iso-butene, together with the hydrogen formed in the process, the latter being separated after cooling and condensation and commingled with the hydrogen formed in the first mentioned dehydrogenation treatment for use as hereinafter described.

The fraction formed from the last mentioned dehydrogenation zone containing the excess of normal butenes is subjected to polymerization treatment in the presence of a phosphoric acid-containing catalyst at a temperature of 250° F. and approximately 1000 pounds per square inch. In this step, approximately 141 mols of normal butene and 97 mols of iso-butene are converted to normally liquid polymers. Between the first and second stage of this step approximately 64 mols of iso-butene are added, this material having been formed in the iso-butane dehydrogenation treatment. The product from the second step contains approximately 67 mols of iso-butene and 75 mols of normal butene as normally liquid polymers, 2 mols of iso-butene and 22 mols of normal butene, together with the unconverted butanes.

The residual butane-butene fraction is separated from the normally liquid polymers following the polymerization treatment, the former commingled with the iso-butene fraction formed as previously described, and the mixture subjected to polymerization treatment in the presence of a phosphoric acid-containing catalyst at a temperature of 225° F. and at a pressure of 1000 pounds per square inch. Products from this treatment comprising essentially normally liquid polymers and unconverted butanes are separated and the latter returned to the second mentioned dehydrogenation treatment. The normally liquid polymers formed in the last mentioned polymerization treatment are commingled with those from the first mentioned polymerization treatment and the mixture fractionated to separate heavy polymers from the lighter normally liquid polymers and the latter hydrogenated in the presence of a nickel-containing catalyst at a temperature of 275° F. and at a pressure of 100 pounds per square inch. The heavy polymers corresponding to approximately 5.9 mol per cent of the charging stock and iso-octane corresponding to approximately 43.4 mol per cent of the original charging stock are recovered as products of the process.

From this operation, starting with 300 mols of iso-butane and 700 mols of normal butane, it is possible to convert 246 mols of iso-butane and 246 mols of normal butane into normally liquid polymers, 88% of which is iso-octane. Also approximately 42 mol per cent of the original charging stock is recovered as substantially normal butane which could be used for blending in gasolines to raise its vapor pressure or for any other desired purpose. The loss from the process usually amounts to about 8.8 mol per cent of the charging stock.

I claim as my invention:

1. In a process for the production of iso-octane wherein normal and isobutanes present in the charge are subjected to dehydrogenation treatment to convert the butanes to butenes and the butenes subsequently polymerized to form iso-octenes which are hydrogenated to iso-octane, the improvement which comprises separating the normal and isobutane mixture into two portions, fractionating one portion to separate an isobutane fraction from the normal butane fraction and recovering the latter, subjecting said isobutane fraction to dehydrogenation treatment to effect substantial conversion to isobutene, substantially separating isobutane from the isobutene and hydrogen and returning the former to the dehydrogenation treatment, concurrently therewith subjecting the other portion of said normal and isobutane mixture to a separate dehydrogenation treatment to effect substantial dehydrogenation to butenes and hydrogen, separating and commingling the hydrogen formed in both dehydrogenation treatments for use as hereinafter set forth, subjecting the products from the second mentioned dehydrogenation treatment after separation of hydrogen to polymerization treatment under conditions selected to effect substantial polymerization to iso-octenes, commingling the residual unconverted gases from said polymerization treatment with the isobutene fraction formed in the first mentioned dehydrogenation treatment and subjecting the mixture to a separate polymerization treatment to polymerize a substantial portion of the remaining butenes, separating the unconverted gases from the normally liquid polymers formed in the last-named polymerization treatment and returning the former to the second-mentioned dehydrogenation treatment, commingling the polymers from both polymerization treatments and subjecting the mixture to hydrogenation treatment using hydrogen separated as previously set forth and recovering therefrom a hydrogenated polymer.

2. In a process for the production of iso-octane from charging stock containing essentially normal and isobutanes wherein said charging stock is subjected to dehydrogenation treatment to convert the butanes to butenes and the butenes substantially polymerized to form iso-octenes which are hydrogenated to iso-octane, the improvement which comprises separating said charging stock into two portions, fractionating one portion to separate an isobutane fraction from the normal butane fraction and recovering the latter, subjecting said isobutane fraction to dehydrogenation treatment to effect substantial conversion to isobutene, substantially separating isobutane from the isobutene and hydrogen and returning the former to the dehydrogenation treatment, concurrently therewith subjecting the other portion of said charging stock to a separate dehydrogenation treatment to effect substantial dehydrogenation to butenes and hydrogen, separating and commingling the hydrogen formed in both dehydrogenation treatments for use as hereinafter set forth, subjecting the products from the second mentioned dehydrogenation treatment after separation of hydrogen to polymerization treatment under conditions selected to effect substantial polymerization to iso-octenes, commingling the residual unconverted gases from said polymerization treatment with the isobutene fraction formed in the first mentioned dehydrogenation treatment and subjecting the mixture to a separate polymerization treatment to polymerize a substantial portion of the remaining butenes, separating the unconverted gases from the normally liquid polymers formed in the last-named polymerization treatment and returning the former to the second-mentioned dehydrogenation treatment, commingling the polymers from both polymerization treatments and subjecting the mixture to hydrogenation treatment using hydrogen separated as previously set forth and recovering therefrom a hydrogenated polymer.

3. In a process for the production of iso-octane from charging stock containing essentially normal and isobutanes wherein said charging stock is subjected to dehydrogenation treatment to convert the butanes to butenes and the butenes polymerized to form iso-octenes which are hydrogenated to iso-octane, the improvement which comprises separating said charging stock into two portions, one portion containing the normal butane present in the charge in excess of the quantity which may be advantageously utilized in the process, together with the proportionate quantity of iso-butane, while the other portion is equivalent to the remaining charging material, fractionating the first named portion to separate an iso-butane fraction from the normal butane fraction and recovering the latter, subjecting said isobutane fraction to dehydrogenation treatment to effect substantial conversion to isobutene, substantially separating isobutane from the isobutene and hydrogen and returning the former to the dehydrogenation treatment, concurrently therewith subjecting the second named portion of said charging stock to a separate dehydrogenation treatment to effect substantial dehydrogenation to butenes and hydrogen, separating and commingling the hydrogen formed in both dehydrogenation treatments for use as hereinafter set forth, subjecting the products from the second mentioned dehydrogenation treatment after separation of hydrogen to polymerization treatment under conditions selected to effect substantial polymerization to iso-octenes, commingling the residual unconverted gases from said polymerization treatment with the isobutene fraction formed in the first mentioned dehydrogenation treatment and subjecting the mixture to a separate polymerization treatment to polymerize a substantial portion of the remaining butenes, separating the unconverted gases from the normally liquid polymers formed in the last-named polymerization treatment and returning the former to the second-mentioned dehydrogenation treatment, commingling the polymers from both polymerization treatment and subjecting the mixture to hydrogenation treatment using hydrogen separated as previously set forth and recovering therefrom a hydrogenated polymer.

4. In a process for the production of iso-octane from charging stock containing essentially normal and iso-butanes wherein said charging stock is subjected to dehydrogenation treatment to convert the butanes to butenes and the butenes polymerized to form iso-octenes which are hydrogenated to iso-octane, the improvement which comprises separating said charging stock into two portions, one portion containing the normal butane present in the charge in excess of the quantity which may be advantageously utilized in the process, together with the proportionate quantity of isobutane, while the other portion is equivalent to the remaining charging material, fractionating the first named portion to separate an iso-butane fraction from the normal butane fraction and recovering the latter, subjecting said isobutane fraction to dehydrogenation treatment to effect substantial conversion to isobutene, substantially separating isobutane from the isobutene and hydrogen and returning the former to the dehydrogenation treatment, concurrently therewith subjecting the second named portion of said charging stock to a separate dehydrogenation treatment, subjecting the products from the second named dehydrogenation treatment after separation of hydrogen to polymerization treatment under conditions selected to effect substantial polymerization to iso-octenes and while introducing a portion of the isobutene formed in the first mentioned dehydrogenation treatment, commingling the residual unconverted gases from said polymerization treatment with the residual portion of said isobutene fraction and subjecting the mixture to a separate polymerization treatment to polymerize a substantial portion of the remaining butenes separating the unconverted gases from the normally liquid polymers formed in the last named polymerization treatment and subjecting the former to further dehydrogenation treatment in commingled state with the second named portion of said charging stock, commingling the polymers from both polymerization treatments and subjecting the mixture to hydrogenation treatment using hydrogen separated as previously set forth and recovering therefrom a hydrogenated polymer.

5. In a process for the production of iso-octane from charging stock containing essentially normal and isobutanes wherein said charging stock is subjected to dehydrogenation treatment to convert the butanes to butenes and the butenes polymerized to form iso-octenes which are hydrogenated to iso-octane, the improvement which comprises separating said charging stock into two portions, one portion containing the normal butane present in the charge in excess of the quantity which may be advantageously utilized in the process together with the proportionate quantity of isobutane, while the other portion is equivalent to the remaining charging material, fractionating the first named portion to separate an isobutane fraction from the normal butane fraction and recovering the latter, subjecting said isobutane fraction to dehydrogenation treatment to effect substantial conversion to isobutene, substantially separating isobutane from the isobutene and hydrogen and returning the former to the dehydrogenation treatment, concurrently therewith subjecting the second named portion of said charging stock to a separate dehydrogenation treatment, subjecting the products from the second named dehydrogenation treatment after separation of hydrogen to polymerization treatment under conditions selected to effect substantial polymerization to iso-octenes and while introducing a portion of the isobutene formed in the first mentioned dehydrogenation treatment, commingling the residual unconverted gases from said polymerization treatment with the residual portion of said isobutene fraction and subjecting the mixture to a separate polymerization treatment to polymerize a substantial portion of the remaining butenes, separating the unconverted gases from the normally liquid polymers formed in the last named polymerization treatment and subjecting the former to further dehydrogenation treatment in commingled state with the second named portion of said charging stock, commingling the polymers from both polymerization treatments and fractionating the mixture to separate the light from the heavy polymers, recovering the latter, and subjecting the light polymers to hydrogenation treatment using hydrogen separated as previously set forth and recovering therefrom iso-octane.

6. In a process for the production of iso-octane from charging stock containing essentially normal and iso-butanes wherein said charging stock is subjected to dehydrogenation treatment to convert the butanes to butenes and the butenes polymerized to form iso-octenes which are hydrogenated to iso-octane, the improvement which comprises separating said charging stock into two portions, one portion containing the normal butane present in the charge in excess of the quantity which may be advantageously utilized in the process together with the proportionate quantity of isobutane, while the other portion is equivalent to the remaining charging material, fractionating the first named portion to separate an isobutane fraction from the normal butane fraction and recovering the latter, subjecting said iso-butane fraction to dehydrogenation treatment to effect substantial conversion to isobutene, substantially separating isobutane from the isobutene and hydrogen and returning the former to the dehydrogenation treatment, concurrently therewith subjecting the second named portion of said charging stock to a separate dehydrogenation treatment, subjecting the products from the second named dehydrogenation treatment after separation of hydrogen, together with a butane-butene fraction introduced from an outside source to polymerization treatment under conditions selected to effect substantial polymerization to iso-octenes and while introducing a portion of the isobutene formed in the first mentioned dehydrogenation treatment, commingling the residual unconverted gases from said polymerization treatment with the residual portion of said isobutene fraction and subjecting the mixture to a separate polymerization treatment to polymerize a substantial portion of the remaining butenes, separating the unconverted gases from the normally liquid polymers formed in the last named polymerization treatment and subjecting the former to further dehydrogenation treatment in commingled state with the second named portion of said charging stock, commingling the polymers from both polymerization treatments and fractionating the mixture to separate the light from the heavy polymers, recovering the latter and subjecting the light polymers to hydrogenation treatment using hydrogen separated as previously set forth and recovering therefrom iso-octane.

7. In a process for converting a charging stock comprising essentially normal and iso-butanes into high antiknock motor blending fuel comprising iso-octane, wherein said stock is subjected to dehydrogenation treatment to convert butanes to butylenes, which are then polymerized to liquid polymer, which is in turn hydrogenated to produce substantially saturated motor blending fuel, the improvement which comprises separating at least a part of the iso-butane from the charge, subjecting it to dehydrogenation treatment to produce iso-butylene, concurrently subjecting the remaining portion of said charge to a separate dehydrogenation treatment to produce a mixture containing butylenes, enriching said mixture with a portion of said iso-butylene, subjecting same to polymerization treatment to produce liquid polymer, combining the unconverted butylenes from the polymerization treatment with the remainder of said iso-butylene, subjecting the mixture to a second polymerization treatment, recovering the liquid polymers from both of the polymerization steps, and hydrogenating them with the hydrogen produced in the aforesaid dehydrogenation steps.

8. In a process for the production of iso-octane from charging stock comprising essentially normal and iso-butanes, wherein said stock is subjected to dehydrogenation treatment to convert butanes to butylenes, which are then polymerized to form iso-octylenes, which in turn are hydrogenated to iso-octane, the improvement which comprises separating a substantial portion of iso-butane from the charging stock, subjecting it to dehydrogenation to produce iso-butylene, separately dehydrogenating the remainder of said charging stock, adding a portion of said iso-butylene to the reaction products from the latter step, subjecting the mixture to a polymerization step to produce liquid polymer, combining the unconverted butylenes from said step with the remainder of said iso-butylene, subjecting the mixture to a polymerization treatment, recovering the iso-octylene polymers from both of the polymerization steps, and hydrogenating them to iso-octanes with the hydrogen produced in the aforesaid dehydrogenation steps.

9. In a process for the production of iso-octane wherein normal and iso-butanes present in the charge are subjected to dehydration treatment to convert the butanes to butylenes and the butylenes subsequently polymerized to form iso-octylenes which are hydrogenated to iso-octane, the improvement which comprises separating at least a portion of the iso-butane from the charge, subjecting it to dehydrogenation treatment to produce iso-butylene, concurrently subjecting the remaining portion of said charge to a separate dehydrogenation treatment to produce a mixture containing butylenes, enriching the mixture with a portion of said iso-butylene, subjecting the mixture to polymerization treatment to produce polymer, separating gas containing unconverted butylene from the polymerization treatment, mixing it with the remaining iso-butylene produced in the first mentioned dehydrogenation step, subjecting the mixture to a second polymerization treatment to produce liquid polymers, recovering an iso-octylene fraction from the liquid products of the aforesaid polymerization treatments, and hydrogenating said fraction with the hydrogen produced in said dehydrogenation steps to produce substantially iso-octane.

10. In a process for the production of iso-octane from charging stock containing essentially normal and iso-butanes wherein said stock is subjected to dehydrogenation treatment to convert butanes to butylenes and the butylenes polymerized to iso-octylenes which are hydrogenated to iso-octane, the improvement which comprises separating a substantial portion of iso-butane from the butane charging stock, subjecting it to catalytic dehydrogenation treatment to produce iso-butylene, separately subjecting the remainder of said charging stock to catalytic dehydrogenation treatment to produce a mixture of butylenes, adding a portion of said iso-butylene to the mixture of butylenes produced in the last mentioned dehydrogenation step, subjecting the mixture to polymerization treatment to produce liquid polymer comprising essentially iso-octylenes, combining the unconverted butylenes from the polymerization step with the remainder of said iso-butylene from the first mentioned dehydrogenation step, subjecting the mixture to polymerization treatment to produce liquid polymer, recovering the fraction of said liquid polymer comprising iso-octylene produced in both polymerization steps, and hydrogenating said fraction with the hydrogen produced in said dehydrogenation steps.

11. In a process for the production of iso-octane from charging stock containing essentially normal and iso-butanes wherein said stock is subjected to dehydrogenation treatment to convert butanes to butylenes and the butylenes polymerized to form iso-octylenes, which are hydrogenated to iso-octane, the improvement which comprises separating at least a portion of said iso-butane, subjecting it to catalytic dehydrogenation treatment to produce iso-butylene, separating said iso-butylene for treatment as hereinafter indicated, separately subjecting the remainder of said charging stock to catalytic dehydrogenation to produce a mixture of butylenes, mixing therewith a portion of said iso-butylene, subjecting the mixture to catalytic polymerization to produce liquid polymers, combining the gases containing unconverted butylene from the polymerization treatment with the remaining iso-butylene produced in the first mentioned dehydrogenation step, subjecting the mixture to catalytic polymerization to produce liquid polymers, separating a gaseous fraction comprising essentially butanes, returning said fraction to the last mentioned dehydrogenation step, recovering a fraction of polymers from both polymerization steps comprising essentially iso-octylenes, and hydrogenating it with the hydrogen produced in the aforesaid dehydrogenation steps to produce iso-octane.

LOUIS S. KASSEL.